US012753834B2

(12) United States Patent
Reiter et al.

(10) Patent No.: US 12,753,834 B2
(45) Date of Patent: Oct. 6, 2026

(54) METHOD FOR OPERATING DRIVE ASSEMBLY, DRIVE ASSEMBLY, AND WORK MACHINE

(71) Applicant: DEERE & COMPANY, Moline, IL (US)

(72) Inventors: Dominik Reiter, Gremheim (DE); Norbert Fritz, Ilvesheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/269,240

(22) Filed: Jul. 15, 2025

(65) Prior Publication Data

US 2026/0043471 A1 Feb. 12, 2026

(30) Foreign Application Priority Data

Aug. 9, 2024 (EP) .................................... 24193776

(51) Int. Cl.
*F16H 61/04* (2006.01)
*F16H 59/14* (2006.01)
(Continued)

(52) U.S. Cl.
CPC ....... *F16H 61/0403* (2013.01); *F16H 59/141* (2013.01); *F16H 59/46* (2013.01);
(Continued)

(58) Field of Classification Search
CPC .. F16H 61/0403; F16H 61/061; F16H 61/684; F16H 2061/062; F16H 2061/064;
(Continued)

(56) References Cited

U.S. PATENT DOCUMENTS

| | | | | |
|---|---|---|---|---|
| 5,809,442 A * | 9/1998 | Schulz | F16H 61/702 701/67 |
| 7,278,953 B2 * | 10/2007 | Meyer | F16H 61/061 477/176 |

(Continued)

FOREIGN PATENT DOCUMENTS

| | | | |
|---|---|---|---|
| DE | 102017119594 A1 | 3/2018 |
| EP | 3945665 A1 | 2/2022 |

OTHER PUBLICATIONS

Extended European Search Report and Written Opinion issued in European Patent Application No. 24193776.2 dated Feb. 12, 2025, in 14 pages.

*Primary Examiner* — Huan Le
(74) *Attorney, Agent, or Firm* — Shook, Hardy & Bacon

(57) ABSTRACT

The disclosure relates to a method for operating a drive assembly or a work machine. The drive assembly comprises a main drive element, a first and second clutches, and a traction drive. The method comprises the following steps: identifying a target torque progression of the drive assembly, and identifying a slip point at the first clutch, and setting and/or adjusting the direction of the relative rotational speed of the first and second clutch. The rotational speed of the main drive element is set and/or adjusted until the direction of the relative rotational speed of the first and second clutches is the same, and transmitting the torque from the first clutch to the second clutch. The torque of the drive assembly follows the target torque progression, and synchronizing the second clutch. The disclosure further relates to a drive assembly and to a work machine.

13 Claims, 7 Drawing Sheets

(51) Int. Cl.
*F16H 59/36* (2006.01)
*F16H 59/46* (2006.01)
*F16H 61/06* (2006.01)
*F16H 61/30* (2006.01)
*F16H 61/684* (2006.01)

(52) U.S. Cl.
CPC ........... *F16H 61/061* (2013.01); *F16H 61/30* (2013.01); *F16H 61/684* (2013.01); *F16H 2059/366* (2013.01); *F16H 2059/462* (2013.01); *F16H 2059/465* (2013.01); *F16H 2061/064* (2013.01)

(58) Field of Classification Search
CPC ............. F16H 59/141; F16H 2059/366; F16H 2059/462; F16H 2059/465
See application file for complete search history.

(56) References Cited

U.S. PATENT DOCUMENTS

| | | | | |
|---|---|---|---|---|
| 10,830,294 | B2 | 11/2020 | Kim | |
| 11,028,887 | B2 | 6/2021 | Hu et al. | |
| 2009/0156359 | A1* | 6/2009 | Tabata | F16H 61/0437<br>477/108 |
| 2010/0261577 | A1 | 10/2010 | Macfarlane et al. | |
| 2018/0045254 | A1 | 2/2018 | Bulgrien et al. | |

* cited by examiner

METHOD FOR OPERATING DRIVE ASSEMBLY, DRIVE ASSEMBLY, AND WORK MACHINE

CROSS-REFERENCE TO RELATED APPLICATIONS

This application claims priority to European Patent Application No. 24193776.2, filed Aug. 9, 2024, which is hereby incorporated by reference.

TECHNICAL FIELD

The present disclosure relates generally to a method for operating a drive assembly.

BACKGROUND

In today's work machines, in particular towing vehicles, with a motor and, for example, with a power-shift transmission, the gears are shifted by the overlapping control of two clutches. Consequently, in the case of these clutches a slip with opposite signs occurs such that there are short periods in which the clutches generate a torque in opposite directions. This makes it difficult to control the torque at the output shaft during the shifting. For this reason, the shifting procedure is less comfortable and perceptible.

SUMMARY

It is an object of the present disclosure to propose a method and a drive assembly and a work machine which are improved in comparison with the prior art. Specifically, it is an object of the present disclosure to propose a method for operating a drive assembly, a drive assembly, and a work machine which are configured structurally in a simpler and/or more compact fashion and/or allow a seamless or imperceptible shifting procedure.

This object is achieved by a method for operating a drive assembly having the features of one or more embodiments disclosed herein and a drive assembly having the features of one or more embodiments disclosed herein, and a work machine having the features of one or more embodiments disclosed herein.

According to the disclosure, a method for operating a drive assembly, in particular a method for performing or operating a shifting procedure of the drive assembly. The drive assembly comprises at least one main drive element and at least one first clutch, in particular a clutch to be opened, and a second clutch, in particular a clutch to be closed, and a traction drive, preferably an output shaft, particularly preferably a first output shaft. The first and second clutch can be friction clutches.

The method comprises the following steps:

i. Identifying a target torque progression of the drive assembly, preferably of the traction drive, particularly preferably of the output shaft, and ii. Identifying a slip point or a first slip at the first clutch, and iii. Setting and/or adjusting, and in particular identifying, the direction and/or the sign of the relative rotational speed of the first and second clutch until the direction and/or the sign of the relative rotational speed of the first and second clutch is the same or identical. The setting and/or adjusting of the direction and/or the sign of the relative rotational speed of the first and second clutch can be effected with the main drive element, in particular by means of a change in the rotational speed of the main drive element.

iv. Transmitting the torque from the first clutch to the second clutch, wherein the torque of the drive assembly, preferably of the traction drive, particularly preferably of the output shaft, follows the target torque progression, and v. Synchronizing the second clutch, in particular by the rotational speed of the main drive element being set and/or adjusted. Specifically, the synchronization of the second clutch can take place in particular as a function of an operating mode.

Connected can preferably be understood as meaning mechanically connected, particularly preferably drivably connected, i.e. connected in a torque- and/or rotational speed-transmitting manner, and/or coupled or couplable, i.e. mechanically coupled and/or rigidly coupled or mechanically couplable. Mechanically connected, preferably drivably connected and/or coupled or couplable, or mechanically coupled or mechanically couplable, can therefore specifically be understood as meaning a connection of two components which makes it possible to transmit an energy and/or a force and/or a torque and/or a rotational speed from one component to the other, in particular mechanically. Further components or parts enabling such a transmission of energy and/or force and/or torque and/or transmission of a rotational speed between the two components can be provided between the two components. Identify can in particular be understood as meaning calculate and/or measure and/or detect and/or evaluate.

The steps can be executed in the sequence steps i. to v. one after the other or consecutively. The steps i. to ii., in particular i. to iii., can be executed at the same time. The target torque progression can be a progression of the torque during the shifting procedure. The target torque progression can be the torque progression of the traction drive, in particular of the output shaft. The target torque progression can in particular be a progression of the torque in which the shifting behavior cannot be perceived. Identifying the target torque progression of the drive assembly can take place in particular as a function of an operating mode and/or a historical torque progression. The target torque progression can be identifiable, in particular calculatable, on the basis of the historical torque progression. Specifically, identifying the target torque progression can take place before the shifting procedure of the drive assembly, i.e. in particular before the transmission of the torque from the first to the second clutch.

The target torque progression can be identified by extrapolation, for example by or by means of the expansion of the torque progression over time of a zero order, first order, or higher, for example Nth order, i.e. for example a Taylor expansion:

$$T_A(t, t_0) = \sum_{n=0}^{N} \frac{f^{(n)}(t_0)}{n!}(t-t_0)^n$$

where $T_A(t,t_0)$=target torque progression, in particular as a function of time. Specifically, the target torque progression of the traction drive, in particular of the output shaft.

For example, for the target torque progression of the first order:

$$T_A(t, t_0) = T_0 + k(t - t_0)$$

where $T_A(t,t_0)$=torque at the beginning of the shifting procedure, preferably the beginning of the transmission of the torque from the first clutch to the second clutch.

$T_A(t,t_0)$=factor for increasing or reducing the target torque progression, i.e. in particular the slope.

Specifically, the target torque progression can be a constant value. For example, for the target torque progression it can be that:

$$T_A(t) = T_0$$

where $T_A(t)$=target torque progression, in particular as a function of time. Specifically, the target torque progression of the traction drive, in particular of the output shaft.

$T_0$=first torque=torque before or at the beginning of the shifting procedure, in particular torque before or at the beginning of the transmission of the torque from the first clutch to the second clutch.

The operating modes can be the following modes:

The operating mode "traction" with "traction upshifting"—for example, acceleration of the drive assembly or the work machine against resistance, for example uphill or with significant rolling resistance.

The operating mode "traction" with "traction downshifting"—for example, the drive assembly or the work machine can drive against resistance (for example, uphill with a trailer) and can no longer, for example, maintain the speed in the current gear and have to shift down because of the power limitation.

The operating mode "overrun" with "overrun upshifting"—for example, acceleration of the drive assembly or the work machine downhill. The work machine has to shift up because the drive assembly, in particular the main drive element, has reached a speed limitation. The flow of force in the drive train can be decelerated.

The operating mode "overrun" with "overrun downshifting"—for example, decelerating or braking the drive assembly or the work machine downhill with the deceleration power of the drive assembly for limiting the vehicle speed.

The main drive element can be configured as a torque and/or rotational speed sensor. The torque and/or the rotational speed can be identified with the main drive element. Specifically, the torque can be identified by means of the main drive element at the beginning of the shifting procedure $T_0$. The target torque progression can thus advantageously be identified from the torque of the main drive element, for example from the historical data, and/or in particular in real time and/or taking into account the gear ratio and the losses.

The slip point at the first clutch can be identified without changing the torque at the traction drive or the output shaft. The direction and/or the sign of the relative rotational speed, i.e. in particular the relative rotational speed direction, of the first and second clutch can be set and/or adjusted by the rotational speed of the main drive element being set and/or adjusted. The direction and/or the sign of the relative rotational speed of the first and second clutch can be set and/or adjusted until the direction and/or the sign of the relative rotational speed of the first and second clutch is the same or identical. Specifically, the rotational speed of the first and/or second clutch can be set and/or adjusted by means of the main drive element, in particular before the beginning of the transmission of the torque, such that both clutches have the same direction and/or the same sign of the relative rotational speed, i.e. in particular the same relative rotational speed direction. Additionally, the rotational speed of the first and/or second clutch can be set and/or adjusted by means of the main drive element during the transmission of the torque such that both clutches have the same direction and/or the same sign of the relative rotational speed, i.e. in particular the same relative rotational speed direction.

The relative rotational speed of the first and/or second clutch can, when the clutches are arranged on or at a driven shaft of the main drive element, which can in particular simultaneously be an input shaft, be defined as follows:

$$\Delta n = n_{driven,i} - n_{drive}$$

where $n_{driven,i}$=rotational speed of the driven side of the ith clutch.

$n_{drive}$=rotational speed of the main drive element, in particular the driven side of the main drive element.

Clutches can, however, also be arranged on or at the driven shaft and further clutches on or at the output shaft. The driving rotational speed would then not be the same for all the clutches.

In the case of a positive sign or a positive direction, torque can thus be transmitted from the respective clutch to the main drive element (generator mode) and, in the case of a negative sign or a negative direction, torque can thus be transmitted from the main drive element to the respective clutch (motor mode).

The main drive element can be designed as an energy machine, in particular as a motor or an internal combustion engine or an electric motor. The main drive element can be designed alternatively. The main drive element can be operatable as a motor and/or a generator. The main drive element can drive the drive assembly with a force and/or a rotational speed and/or a torque, in particular therefore connected, and/or coupled or couplable, to the first and second clutch and to the traction drive, preferably to the output shaft, so that torque and/or rotational speed can be transmitted. The main drive element can comprise a driven output and/or a driven shaft. The main drive element, in particular the driven output and/or the driven shaft, can be connected to the first and second clutch, and in particular to the traction drive, preferably to the output shaft. For example, the main drive element can be connected to the first clutch directly or via a or by means of a or by a first transmission stage, in particular a first spur gear stage or a first gearwheel pair or a first planetary set, or a first transmission, in particular connected to a drive side of the first clutch. Likewise, the main drive element can be connected to the second clutch directly or via a or by means of a or by a second transmission stage, in particular a second spur gear stage or a second gearwheel pair or a second planetary set, or a second transmission, in particular connected to a drive side of the second clutch.

The first clutch, in particular a driven side of the first clutch, can be connected to the traction drive, preferably to the output shaft. Specifically, the first clutch, in particular the driven side of the first clutch, can be connected to the traction drive, preferably to the output shaft, directly or via a or by means of a or by a third transmission stage, in particular a third spur gear stage or a third gearwheel pair or a third planetary set, or a third transmission. Additionally, the second clutch, in particular a driven side of the second clutch, can be connected to the traction drive, preferably to the output shaft. Specifically, the second clutch, in particular the driven side of the second clutch, can be connected to the traction drive, preferably to the output shaft, directly or via a or by means of a or by a fourth transmission stage, in particular a fourth spur gear stage or a fourth gearwheel pair or a fourth planetary set, or a fourth transmission. Alternatively or additionally, a main transmission can comprise the first and/or second clutch and/or the traction drive, preferably the output shaft. Alternatively, the traction drive can, however, also comprise a further transmission, in particular a power-shift transmission and/or a multi-stage transmission, wherein the output shaft can be mechanically connected to the further transmission. The further transmission can comprise a further output shaft and the further output shaft can drive one or more vehicle axles, in particular a first and/or a second vehicle axle. The spread of the drive assembly can consequently be increased.

The main drive element can be connected to the traction drive, in particular to the output shaft, with a fixed transmission ratio or with a variable transmission ratio. The main drive element can also be designed as a generator and can charge an energy store, in particular in a regeneration mode. The main drive element can be connected directly or indirectly to a first power output. The drive assembly can comprise power electronics in order to transmit the electrical power between the main drive element and the energy store, in particular when the main drive element is designed as an electric motor.

The drive assembly, in particular the work machine, can comprise the energy store or stores. The energy store or stores can be electrically connected and/or electrically couplable to the main drive element. The energy store can be an electrical energy store. The energy store can supply the connected main drive element with energy, in particular electrical energy. The energy store can be connected and/or couplable, in particular electrically connected and/or electrically couplable, to the main drive element. The energy store can be designed as a battery and/or a rechargeable battery and/or a supercapacitor and/or a fuel cell and/or some other device for storing energy, in particular electrical energy.

The first power output can comprise a second output shaft and/or can be designed as a second output shaft. Likewise, the first power output can additionally comprise a PTO unit. The PTO unit can comprise a PTO transmission and/or a PTO shaft. The PTO unit, in particular the PTO transmission, can be connected on the drive side to the second output shaft. Moreover, the PTO unit, in particular the PTO transmission, can be connectable or connected on the driven side to the PTO shaft.

The drive assembly or the work machine can comprise a control unit. The control unit can be connected to the main drive element by signals, and/or operatively coupled thereto and/or connected thereto for transmitting signals and/or carrying data. The control unit can be configured to receive one or more rotational speed signals and/or torque signals from the drive assembly, in particular from rotational speed and/or torque sensors of the drive assembly, and/or from the main drive element. Specifically, the control unit can be configured to identify a torque and/or a rotational speed of the drive assembly, preferably of the traction drive, particularly preferably of the output shaft, in particular to capture it with one or more rotational speed and/or torque sensors of the drive assembly, and to receive a rotational speed signal and/or a torque signal from the sensors. The torque of the drive assembly, preferably of the traction drive, particularly preferably of the output shaft, can be an actual torque and/or the rotational speed of the drive assembly, preferably of the traction drive, particularly preferably of the output shaft, can be an actual rotational speed. The control unit can be configured to compare the actual torque with the target torque such that it can be identified whether the torque of the drive assembly, preferably of the traction drive, particularly preferably of the output shaft, follows the target torque progression. The control unit can be configured to identify a rotational speed and/or torque by means of the rotational speed signal and/or the torque signal. The control unit can be configured to set and/or adjust the rotational speed and/or the torque of the drive assembly, in particular of the main drive element, in particular to set and/or adjust a specifiable rotational speed and/or a specifiable torque. The control unit can be configured to set and/or adjust the rotational speed of the first power output.

In the case of the synchronization, the rotational speed of the main drive element can be set and/or adjusted in order to set and/or adjust the relative rotational speed to zero in the second clutch, in particular to reach zero.

The essential part of the disclosure is that the method has the following steps:

i Identifying the target torque progression ii. Slip recognition iii. Adapting the direction or the sign of the relative rotational speed iv. Transmitting the torque between the first and second clutch, wherein in particular the torque of the drive assembly, preferably of the traction drive, particularly preferably of the output shaft, follows the target torque progression v. Synchronization of the main drive element.

Seamless and/or imperceptible shifting can advantageously be implemented by the method. The slip recognition can advantageously take place more quickly in comparison with known slip recognition, in particular by the use of the torque of the main drive element. The transmission of the torque can advantageously take place or be implemented by the method with a constant torque or an imperceptible change of torque at the traction drive, in particular at the output shaft. Likewise, the main drive element can advantageously be used as a rotational speed and/or torque sensor, preferably to increase the accuracy of the clutch modulation, particularly preferably taking into account the dynamic simulation model of the drive assembly with inertia.

In one embodiment of the disclosure, identifying the target torque progression comprises the following steps:

Identifying the first torque $T_0$ at the traction drive, in particular at the output shaft. Identifying the first torque $T_0$ can in particular be the torque before or at the beginning of the shifting procedure or before or at the beginning of the transmission, and/or.

Identifying a second torque of the drive assembly and identifying the first torque $T_0$ as a function of or by means of the second torque. Identifying the second torque can in particular be the torque before or at the beginning of the shifting procedure or before the transmission, and/or Identifying the target torque progression as a function of or by means of the first or second torque.

Identifying the first torque can comprise capturing and/or calculating the first torque at the traction drive, in particular at the output shaft. Identifying the second torque can comprise capturing and/or calculating the second torque at the drive assembly, for example at the first or second clutch or at the main drive element or further components of the drive assembly. Identifying the second torque can, when the main drive element is designed as an electric motor, take place by means of or by the current/torque constant or a torque sensor, in particular a first torque sensor, at or in the main drive element. Identifying the second torque can, when the main drive element is designed as an internal combustion engine, take place by means of or by the injection quantity or the torque sensor, in particular the first torque sensor, at or in the main drive element. The target torque progression can, as described above, be identified by extrapolation.

In one embodiment of the disclosure, identifying the slip point of the first clutch comprises the following step: Opening of the first clutch, preferably reducing the torque capacity of the first clutch, particularly preferably reducing a current strength of a first valve of the first clutch, until the rotational speed of the main drive element at the driven side and the rotational speed of the first clutch at the driven side or the rotational speed of the first clutch at the drive side and the rotational speed of the first clutch (K1) at the driven side are different. Specifically, the opening of the first clutch can comprise adjusting the normal force in the first clutch. Specifically, identifying the slip point of the first clutch comprises the following steps:

Identifying the rotational speed of the main drive element at the driven side and the rotational speed of the first clutch at the driven side or the rotational speed of the first clutch at the drive side and the rotational speed of the first clutch at the driven side, and Comparing the rotational speed of the main drive element at the driven side with the rotational speed of the first clutch at the driven side, and Reducing the torque capacity of the first clutch, preferably reducing the current strength of the first valve of the first clutch, when the rotational speed of the main drive element at the driven side and the rotational speed of the first clutch at the driven side are the same or identical, until the rotational speed of the main drive element at the driven side and the rotational speed of the first clutch at the driven side are different.

In other words, identifying the slip point of the first clutch can comprise the following steps:

a) Identifying the rotational speed of the main drive element at the driven side and the rotational speed of the first clutch at the driven side or the rotational speed of the first clutch at the drive side and the rotational speed of the first clutch at the driven side, and
b) Comparing the rotational speed of the main drive element at the driven side or the rotational speed of the first clutch at the drive side with the rotational speed of the first clutch at the driven side, and
c) Reducing the torque capacity of the first clutch, preferably reducing the current strength of the first valve of the first clutch, when the rotational speed of the main drive element at the driven side and the rotational speed of the first clutch at the driven side are the same or identical, and
d) Repeating steps a) to c) until the rotational speed of the main drive element at the driven side and the rotational speed of the first clutch at the driven side are different.

Depending on the structure of the drive assembly, the rotational speed of the main drive element at the driven side can be not the same as the rotational speed of the first clutch at the drive side. In this case, however, the rotational speed of the first clutch at the drive side can be identified, in particular be calculated, from the state and/or the structure of the drive assembly and the rotational speed of the main drive element at the driven side.

Likewise, identifying the slip point of the first clutch can comprise the following steps:

a) Quickly opening the first clutch, preferably quickly reducing the torque capacity of the first clutch, in particular to an upper torque capacity, or preferably quickly reducing the current strength of the first valve of the first clutch, in particular to an upper current strength, and
b) Identifying the rotational speed of the main drive element at the driven side or the rotational speed of the first clutch at the drive side and the rotational speed of the first clutch at the driven side, and
c) Comparing the rotational speed of the main drive element at the driven side or the rotational speed of the first clutch at the drive side with the rotational speed of the first clutch at the driven side, and
d) Reducing the torque capacity of the first clutch, preferably reducing the current strength of the first valve of the first clutch, when the rotational speed of the main drive element at the driven side or the rotational speed of the first clutch at the drive side and the rotational speed of the first clutch at the driven side are the same or identical, and
e) Repeating steps a) to d) until the rotational speed of the main drive element at the driven side or the rotational speed of the first clutch at the drive side and the rotational speed of the first clutch at the driven side are different.

Step d) can be designed as a ramp or ramp function from the upper torque capacity, or the upper current strength, to the torque capacity or current strength at the slip point. Quickly reducing the torque capacity or quickly reducing the current strength of the first valve can mean decreasing or reducing in particular within $t \leq 50$ ms, $t \leq 20$ ms, $t \leq 10$ ms. The upper torque capacity can be greater than the torque capacity at the slip point. Alternatively or additionally, the upper current strength can be greater than the current strength at the slip point. The upper torque capacity and the upper current strength can be identified by means of or by the torque, in particular the first torque, of the main drive element or the rotational speed of the first clutch at the drive side. The current strength can be derived from the torque determination of the main drive element or the rotational speed of the first clutch at the drive side.

The first and second clutches can be connected by signals to the control unit and/or be operatively coupled and/or connected thereto for transmitting signals and/or carrying data. Specifically, the drive assembly can comprise the first valve or a first valve assembly, in particular a first control valve, or a first actuator for activating and/or setting and/or adjusting the first clutch. The first valve or the first valve assembly or the first actuator can be connected to the first clutch. Likewise, the drive assembly can comprise the second valve or a second valve assembly, in particular a second control valve, or a second actuator for activating and/or setting and/or adjusting the second clutch. The second valve or the second valve assembly or the second actuator can be connected to the second clutch. The control unit can be connected by signals to the first and/or second valve or to the first and/or second valve assembly or to the first and/or second actuator and/or be operatively coupled and/or connected thereto for transmitting signals and/or carrying data. The control unit can be configured to activate and/or set and/or adjust the first clutch, in particular via or by means of the first valve or the first valve assembly or the first actuator. The control unit can be configured to set and/or adjust the first clutch, in particular via or by means of the first valve or the first valve assembly or the first actuator, to the first or second position, in particular, also to move the first clutch from the first to the second position, and vice versa. The control unit can be configured to activate and/or set and/or adjust the second clutch, in particular via or by means of the second valve or the second valve assembly or the second actuator. The control unit can be configured to set and/or adjust the second clutch, in particular via or by means of the second valve or the second valve assembly or the second actuator, to the first or second position, in particular also to move the second clutch from the first to the second position, and vice versa. The drive assembly has the advantages set out above. Moreover, identifying the slip point at the first clutch can advantageously take place very quickly, in particular more quickly than in the prior art. In other words, quick recognition of the slip point can advantageously be implemented by the above measures.

In one embodiment of the disclosure, the setting and/or adjusting of the direction and/or the sign of the relative rotational speed, i.e. in particular the direction of the relative rotational speed, of the first and second clutch takes place as a function of the operating mode. Specifically, the setting and/or adjusting of the direction and/or the sign of the relative rotational speed of the first and second clutch comprises the following steps:

Reducing the rotational speed of the main drive element when the drive assembly is operated in one of the modes of the "overrun" operating mode until the direction and/or the sign of the relative rotational speed of the first and second clutch is the same or identical, or.

Increasing the rotational speed of the main drive element when the drive assembly is operated in one of the modes of the "traction" operating mode until the direction and/or the sign of the relative rotational speed of the first and second clutch is the same or identical.

The steps can be performed when the first clutch is opened until the slip begins and still transmits approximately the whole torque, but before the second clutch is closed.

In the "traction" mode with "traction upshifting" and "traction downshifting", both clutches can consequently be driven or moved advantageously. In the "overrun" mode with "overrun upshifting" and "overrun downshifting", both clutches can consequently be braked advantageously.

In one embodiment of the disclosure, the method comprises the following steps:

Performing one filling step in which the second clutch is filled with a fluid, for example hydraulic oil or the like, preferably the current strength of the second valve of the second clutch is increased to a maximum current strength and reduced again, and/or.

Performing an emptying step in which the first clutch is emptied of a fluid.

The filling step can take place or be performed before the transmission of the torque and after the identifying of the slip point. The filling step can initiate transmission of the torque of the second clutch. By increasing the torque capacity to a maximum torque capacity, preferably increasing the current strength of the second valve of the second clutch to a maximum current strength, an actuator of the second clutch can be moved toward a plate stack of the second clutch (fill pulse). The emptying step can take place or be performed during or after the synchronization.

In one embodiment of the disclosure, the transmitting of the torque from the first clutch to the second clutch comprises the following steps:

Opening the first clutch as a function of an opening progression, in particular a specified opening progression, and Closing the second clutch as a function of the opening progression of the first clutch such that in particular the torque of the traction drive, preferably of the output shaft, follows the target torque progression. Specifically, the actual torque can additionally be compared with the target torque progression.

The steps can take place simultaneously. The steps can be repeated until the first clutch transmits no torque and the second clutch transmits the whole torque. Optionally, the torque of the main drive element can be set and/or adjusted, in particular whilst the first clutch is opened and the second clutch is closed, such that the sign of the relative rotational speed of the first and second clutch is identical or the same during the transmission of the torque. The opening progression, in particular the progression of the torque of the first clutch, preferably during the transmission, can be identified, in particular be specified, with the following assumptions. The transmission ratios during the shifting procedure, i.e. the transmission of the torque from the first to the second clutch, can be as follows:

$$i_1 = \frac{n_{drive}}{n_1} i_2 = \frac{n_{drive}}{n_2} q = \frac{i_1}{i_2}$$

where $i_1$=transmission ratio at the first clutch.

$n_1$=rotational speed at the first clutch, in particular the driven side of the first clutch $i_2$=transmission ratio at the second clutch.

$n_2$=rotational speed at the second clutch, in particular the driven side of the second clutch.

$n_{drive}$=rotational speed of the main drive element, in particular the driven side of the main drive element.

q=quotient of the transmission ratios.

The opening progression, in particular the progression of the torque of the first clutch, preferably during the transmission, can be identified and/or represented by or by means of extrapolation, for example by or by means of expansion of the torque progression over time of the first clutch of a zero order, or first order, or higher, for example Nth order, i.e. for example a Taylor expansion.

$$T_1(t, t_0) = \sum_{n=0}^{N} \frac{f^{(n)}(t_0)}{n!} (t-t_0)^n$$

where $T_1(t,t_0)$=opening progression, in particular the progression of the torque of the first clutch as a function of time, preferably during the transmission.

For example, for the opening progression of a first order, i.e. a linear opening progression, it can be that:

$$T_1(t, t_0) = \frac{T_A(t_0)}{i_1}\left(\frac{T-(t-t_0)}{T}\right)$$

where $T_A(t_0)=T_0$=torque before or at the beginning of the shifting procedure, preferably before or at the beginning of the transmission of the torque from the first clutch to the second clutch. Specifically, the target torque progression of the traction drive, in particular of the output shaft.

T=duration of the transmission of the torque.

$t_0$=time at which the transmission begins.

For the closing of the second clutch as a function of the opening progression of the first clutch:

$$T_2(t, t_0) = \frac{T_A(t_0)\cdot\left(1-\frac{T-(t-t_0)}{T}\right)}{i_2}$$

where $T_2(t_0)$=progression of the torque of the second clutch as a function of the opening progression of the first clutch, preferably during the transmission.

T=duration of the transmission of the torque.

$t_0$=time at which the transmission begins.

Opening the first clutch can comprise reducing or lowering of the torque capacity, preferably reducing or lowering of the current strength of the first valve of the first clutch. Closing the second clutch can comprise increasing the torque capacity, preferably increasing the current strength of the second valve of the second clutch. The opening the first clutch and the closing of the second clutch can take place in discrete steps. The torque of the clutches can here be set and/or adjusted in discrete steps, wherein the discrete steps follow the opening progression. The method can thus advantageously take place as a seamless shifting procedure.

In one embodiment of the disclosure, the synchronization of the second clutch comprises the following steps, in particular after the torque transfer is complete, in the case of a slipping clutch:

Increasing the rotational speed of the main drive element when the drive assembly is operated in an "overrun" operating mode, or Reducing the rotational speed of the main drive element when the drive assembly is operated in a traction operating mode.

The synchronization can take place in particular after the transmission of the torque.

In one embodiment of the disclosure, the following steps take place after the synchronization:

Completely opening the first clutch, preferably reducing or lowering the torque capacity of the first clutch, particularly preferably the current strength of the first valve of the first clutch, to 0, and/or Emptying the clutch, and/or.

Closing the second clutch, preferably increasing the torque capacity to the maximum or, for example, twice the torque capacity, particularly preferably increasing the current strength of the second valve of the second clutch to the maximum current strength.

The disclosure further relates to a drive assembly for performing a method of one or more embodiments disclosed herein. The drive assembly has the abovedescribed advantages of the method.

In one embodiment of the disclosure, the drive assembly comprises a main drive element, a first and second clutch, and a traction drive, in particular an output shaft. The drive assembly can be operated in such a way that:

i. A target torque progression of the drive assembly can be identified, and ii. A slip point at the first clutch can be identified, and iii. The direction of the relative rotational speed of the first and second clutch can be set and/or adjusted, wherein the rotational speed of the main drive element is set and/or adjusted until the direction of the relative rotational speed of the first and second clutch is the same or identical, and iv. The torque can be transmitted from the first clutch to the second clutch, wherein in particular during the transmission the opening of the first clutch takes place as a function of an opening progression and the closing of the second clutch takes place as a function of the opening progression of the first clutch, wherein in particular the torque of the drive assembly, preferably of the traction drive, particularly preferably of the output shaft, follows the target torque progression, and v. The second clutch can be synchronized by the rotational speed of the main drive element being set and/or adjusted.

In other words, the drive assembly can comprise a control unit. The control unit can be configured:

To identify a target torque progression of the drive assembly, preferably of the traction drive, particularly preferably of the output shaft, in particular as a function of a shifting procedure of the drive assembly, and To identify a slip point at the first clutch, and To set and/or adjust the direction or the sign of the relative rotational speed of the first and second clutch, wherein the control unit is further configured to set and/or adjust the rotational speed of the main drive element until the direction or the sign of the relative rotational speed of the first and second clutch is the same or identical, and To transmit the torque from the first clutch to the second clutch, wherein in particular during the transmission the opening of the first clutch takes place as a function of an opening progression and the closing of the second clutch takes place as a function of the opening progression of the first clutch, and To synchronize the second clutch by the rotational speed of the main drive element being set and/or adjusted.

In one embodiment of the disclosure, the main drive element is connected to the first and second clutch. The first and/or second clutch can be connected to the traction drive, in particular to the output shaft. A generatable rotational movement and/or a generatable torque can be imparted to the main transmission or the first and/or second clutch by means of or by the main drive element, in particular via or by means of a first shaft, and at least the traction drive, in particular the output shaft, can be driven by the rotational movement and/or the torque of the main drive element, preferably via the main transmission or the first and/or second clutch.

The disclosure further relates to a work machine, in particular for performing a method of one or more embodiments disclosed herein, comprising a drive assembly of one or more embodiments disclosed herein. The work machine can be a construction machine or a towing vehicle, preferably an agricultural towing vehicle, for example a tractor or hauler, or a car or a vehicle. The work machine has the abovedescribed advantages of the drive assembly.

The first vehicle axle and/or the second vehicle axle can be driven by or via a rotational movement and/or the torque of the main drive element, in particular via the traction drive or the output shaft. The work machine comprises the drive assembly. The drive assembly is designed for driving the work machine. The work machine can comprise one, two, or more axle(s). Specifically, the work machine can comprise the first and/or a second vehicle axle. The first and/or second vehicle axle can be connected to the traction drive, in particular to the output shaft. The work machine can be drivable with a rotational speed and/or force and/or a torque of the main drive element. The first vehicle axle can here be a front axle, in particular a steerable front axle, and/or the second vehicle axle can be a rear axle.

The control unit can be configured for controlling and/or regulating, in particular setting and/or adjusting, the work machine. The work machine can comprise an input and output unit. The control unit can be connected to the input and output unit by signals and/or operatively coupled thereto and/or connected thereto for transmitting signals and/or carrying data, and/or can be activatable and/or settable and/or adjustable by means of the input and output unit. The input and output unit can be integrated into the control unit, or vice versa. The operator of the work machine can use the input and output unit to set and/or adjust a speed of the work machine, for example.

The work machine can moreover comprise one or more auxiliary units, for example a pump and/or a radiator, etc. The auxiliary units can be part of the hydraulic system of the drive assembly. The work machine can comprise the first power output, in particular the PTO unit. The control unit can be configured to set and/or adjust and/or activate the drive assembly and/or the axle and/or work machine by means of a driving signal and to set and/or adjust, in particular to increase or reduce, a speed of the towing vehicle by means of or based on the driving signal. The work machine can comprise the ground engagement means. The ground engagement means can support and/or carry the work machine on the ground. A towing vehicle frame of the work machine can be supported on the ground engagement means. The ground engagement means can be wheels or tracks or chains. In particular, the ground engagement means can be front wheels and rear wheels.

The work machine can comprise a speed sensor, for example a rotational speed sensor, for detecting a speed of the work machine. The control unit can be configured to set and/or adjust and/or activate the drive assembly and/or the work machine, in particular the main drive element and/or the PTO unit, for example by the control unit being configured to set and/or adjust and/or activate the valves and/or valve assemblies of these components. Specifically, the control unit can be configured to set and/or adjust and/or activate a force and/or a torque and/or a rotational speed of the main drive element.

The drive assembly and/or the work machine can comprise the power electronics. The power electronics and/or the energy store can be integrated into the control unit or be activatable by the control unit as an external unit or external units. The power electronics can comprise an electronic control device and/or an inverter and/or a voltage transformer. During operation, the inverter can transform the voltage of the energy store into a voltage or energy or power which is required by the main drive element. This procedure can be reversed for the purpose of charging the energy store.

The control unit can comprise a calculating unit, a computer, a processor, a memory and/or all of the software, hardware, algorithms, connections, and in particular also sensors, which are required for setting and/or adjusting the drive assembly, in particular the main drive element. The energy store can be activatable by suitable control electronics in order to store electrical energy and/or power and output it. The control unit and/or the main drive element can be electrically connected and/or electrically couplable to the power electronics and/or the energy store. Moreover, the supply of voltage and/or current and/or energy and/or power to the drive assembly, in particular the first and/or second and/or third energy machines and/or the energy store, can be controlled and/or settable and/or adjustable via or by means of the power electronics.

The main drive element and/or the power electronics and/or the energy store and/or the PTO unit can be operatable, preferably controllable and/or regulatable, particularly preferably activatable and/or settable and/or adjustable, by means of the control unit. The control unit can send and/or receive signals to control the operation of the drive assembly and/or the axle and/or the work machine. The signals can be expediently provided via a suitable data communication network, for example one which conforms to the ISOBUS and/or CAN standard. The control unit can be designed as an electronic module, an embedded system, a calculating unit, a computer, as a module for controlling and/or regulating the drive assembly and/or the axle and/or the work machine. The control unit can comprise one or more processors and memories and/or all of the software, hardware, algorithms, connections, and in particular also sensors, which are required for the controlling and/or regulating of the drive assembly and/or of the axle and/or of the work machine. Methods can take the form of a program or algorithm which can be executed on and/or by means of the control unit. The control unit can comprise any device which analyzes data from various sensors, compares data and makes the necessary decisions to control and/or regulate and/or carry out the operation of the drive assembly and/or the axle and/or the work machine and the necessary tasks for controlling and/or regulating the operation of the drive assembly and/or the axle and/or the work machine. The control unit can be connected by signals and/or operatively coupled and/or connected for transmitting signals and/or carrying data to the parts of the drive assembly and/or the work machine, i.e. in particular to the main drive element and/or to the power electronics and/or to the energy store and/or to the sensors, for example to one or more speed sensors and/or rotational speed and/or torque sensors. Connected by signals and/or operatively coupled and/or connected for transmitting signals and/or carrying data can here be understood as meaning, inter alia, that signals or data can be exchanged between the connected parts and the control unit. Signals can, for example, be received and sent, and/or processed and/or manipulated, by the control unit. The connection between the control unit as well as the parts or components of the drive assembly and/or the work machine can be implemented by wire, i.e. in particular by means of cables, and/or in a wireless manner, i.e. by radio, for example by means of Bluetooth or WLAN. Communication can take place, for example, by means of Isobus, CAN bus, or the like. The control unit can be connected directly to the input and output unit, which is arranged on or in the work machine and by means of which data entered by an operator can be transmitted to the control unit or received from the control unit and output. The control unit can be integrated into the input and output unit, or vice versa.

Other features and aspects will become apparent by consideration of the detailed description, claims, and accompanying drawings.

BRIEF DESCRIPTION OF THE DRAWINGS

The disclosure and other advantages and advantageous developments and embodiments of the disclosure are explained in greater detail below both in terms of hardware and in terms of method, on the basis of example embodiments and with reference to the drawings. Component parts of equivalent or comparable function are designated here by the same reference signs.

Like reference numerals are used to indicate like elements throughout the several figures.

DETAILED DESCRIPTION

Figure 1:
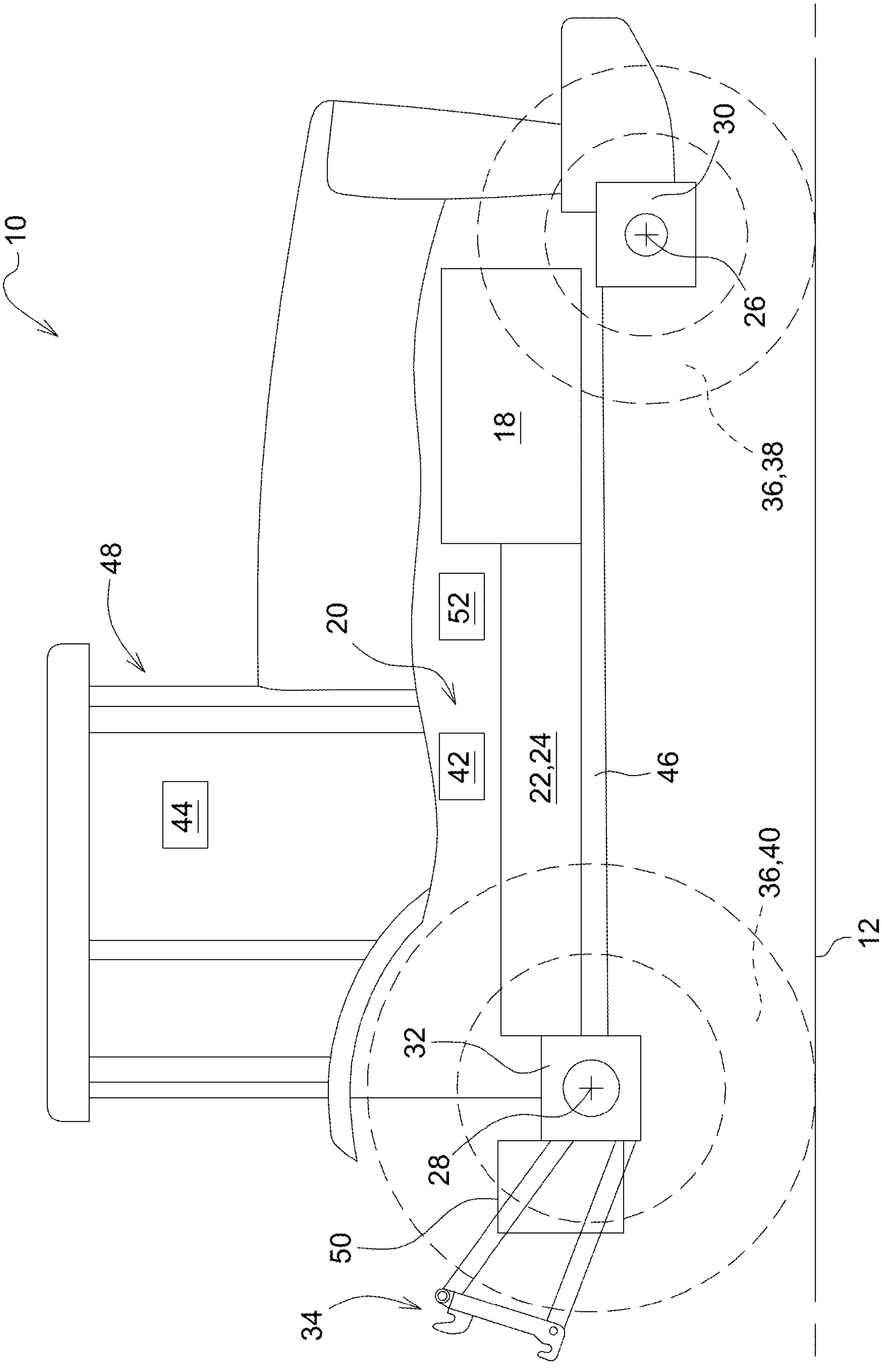
FIG. 1 shows a schematic illustration of a first example embodiment of a work machine according to the disclosure, in particular an agricultural towing vehicle in the form of a hauler.

FIG. 1 shows a schematic illustration of a first example embodiment of a work machine 10, in particular an agricultural towing vehicle which is in the form of a hauler (tractor). The work machine 10, which is movable in a forward direction V, for example over a field, comprises a supporting frame 16 which is supported on the ground by two axles. The work machine 10 comprises a drive assembly 20, in particular a drive assembly 20 according to the disclosure. The drive assembly 20 comprises a main drive element 22 and a first and second clutch K1, K2 as well as a traction drive 100, in particular an output shaft 102 (see FIG. 2). The main drive element 22 can be designed as an energy machine, in particular as a motor or an internal combustion engine or an electric motor. Moreover, the drive assembly 20 can have a main transmission 24 which can comprise the first and second clutch. The drive assembly 20 can, however, also comprise just the first and second clutch K1, K2 and no main transmission 24.

The work machine comprises a first vehicle axle 26 and a second vehicle axle 28. The first vehicle axle 26 can be a front axle, and the second vehicle axle 28 can be a rear axle. Moreover, the first vehicle axle 26 can be embodied as a steerable axle. The drive assembly 20 or the work machine 10 can moreover comprise a first differential 30, i.e. in particular a front axle differential. The first vehicle axle 26 can be connected, in particular drivably connected, to the first differential 30. The drive assembly 20 or the work machine 10 can moreover comprise a second differential 32, i.e. in particular a rear axle differential. The second vehicle axle 28 can be connected, in particular drivably connected, to the second differential 32.

A rotational movement and/or force and/or a torque of the main drive element 22, in particular with different gears, can be transmittable to the output shaft 102, in particular the first output shaft, by means of the main transmission 24 and/or the first and/or second clutch K1, K2. The rotational movement and/or the force and/or the torque of the main drive element 22 can be transmittable to the first and/or second vehicle axle 26, 28 via the output shaft 102, in particular the first output shaft. The first and/or the second vehicle axle 26, 28 convert/converts a rotational movement and/or force and/or a torque of the main drive element 22 into a rotational movement and/or force and/or a torque of one or more ground engagement means 36, for example wheels or tires, and thus into propulsion of the work machine 10. The work machine 10, in particular the drive assembly 20, can comprise one or more ground engagement means 36, illustrated here in the form of tires or wheels 38, 40, which engage with an underlying surface 12 or ground so as to transmit traction forces, and/or by way of which the work machine 10 is supported on the underlying surface 12. The drive assembly 20 is designed for mechanically driving the traction drive 100, in particular the output shaft 102, and/or a first power output 50. The first power output 50 can be designed as a PTO unit. The PTO unit can comprise a PTO transmission and/or a PTO shaft. The PTO unit, in particular the PTO transmission, can be connected at the drive side to the main drive element 22, in particular via a second output shaft. Moreover, the PTO unit, in particular the PTO transmission, can be connectable or connected at the driven side to the PTO shaft. By means of the first power output 50, an implement (not shown) can be drivable which can be attached to the work machine 10 via an interface 34 (for example, a three-point interface).

The work machine 10 can moreover have a frame 46. The frame 46 can in particular be supported by the tires 38, 40 which are suspended on the first and/or second vehicle axle 26, 28. Specifically, a pair of first wheels 38 is arranged on the first vehicle axle 26, and a pair of second wheels 40 is arranged on the second vehicle axle 28, in particular connected rotatably thereto. Here, the radii of the wheels 38, 40 may differ; in particular, the radius of the two first wheels 38 can be smaller than the radius of the two second wheels 40. Alternatively, the ground engagement means 36 could also be designed and arranged as tracks.

The work machine 10, in particular the drive assembly 20, can moreover comprise a control unit 42 and/or an input and output unit 44. The control unit 42 can be connected directly to the input and output unit 44 arranged in a cab 48 of the work machine 10. By means of the input and output unit 44, data entered by an operator can be transmitted to the control unit 42 or be received and output by the latter. The work machine 10, in particular alternatively the drive assembly 20, can comprise a control unit 42. The control unit 42 is connected to the main drive element and/or to the first and/or second clutch K1, K2 by signals, and/or operatively coupled thereto and/or connected thereto for transmitting signals and/or carrying data. The control unit 42 is configured to set and/or adjust the rotational speed and/or the torque of the drive assembly 20, in particular of the main drive element 22. The work machine 10, in particular the drive assembly 20, can comprise an energy store 18, here, for example, a battery (rechargeable battery). The energy store 18 can be connected electrically to the drive assembly 20, in particular to the main drive element 22. The control unit 42 can be configured to set and/or adjust a specifiable rotational speed and/or a specifiable torque of the drive assembly 20, in particular of the main drive element 22. However, the control unit 42 can also be connected to the energy store 18 and/or to power electronics 52 of the work machine 10, in particular alternatively to the drive assembly 20 and/or sensors of the drive assembly 20, in particular alternatively of the work machine 10, by signals, and/or can be operatively coupled thereto and/or connected thereto for transmitting signals and/or carrying data. The control unit 42 can be configured to set and/or adjust the drive assembly 20 and/or the work machine 10, preferably to set and/or adjust the rotational speed and/or the torque of the first power output 50 and/or of the traction drive 100, in particular of the output shaft 102. The energy store 18 supplies the electrically driven elements of the drive assembly 20, in particular the main drive element 22, with currents or voltages of suitable frequency and amplitudes in order to provide desired output rotational speeds or torques for the traction drive 100 and/or the first power output 50.

Figure 2:
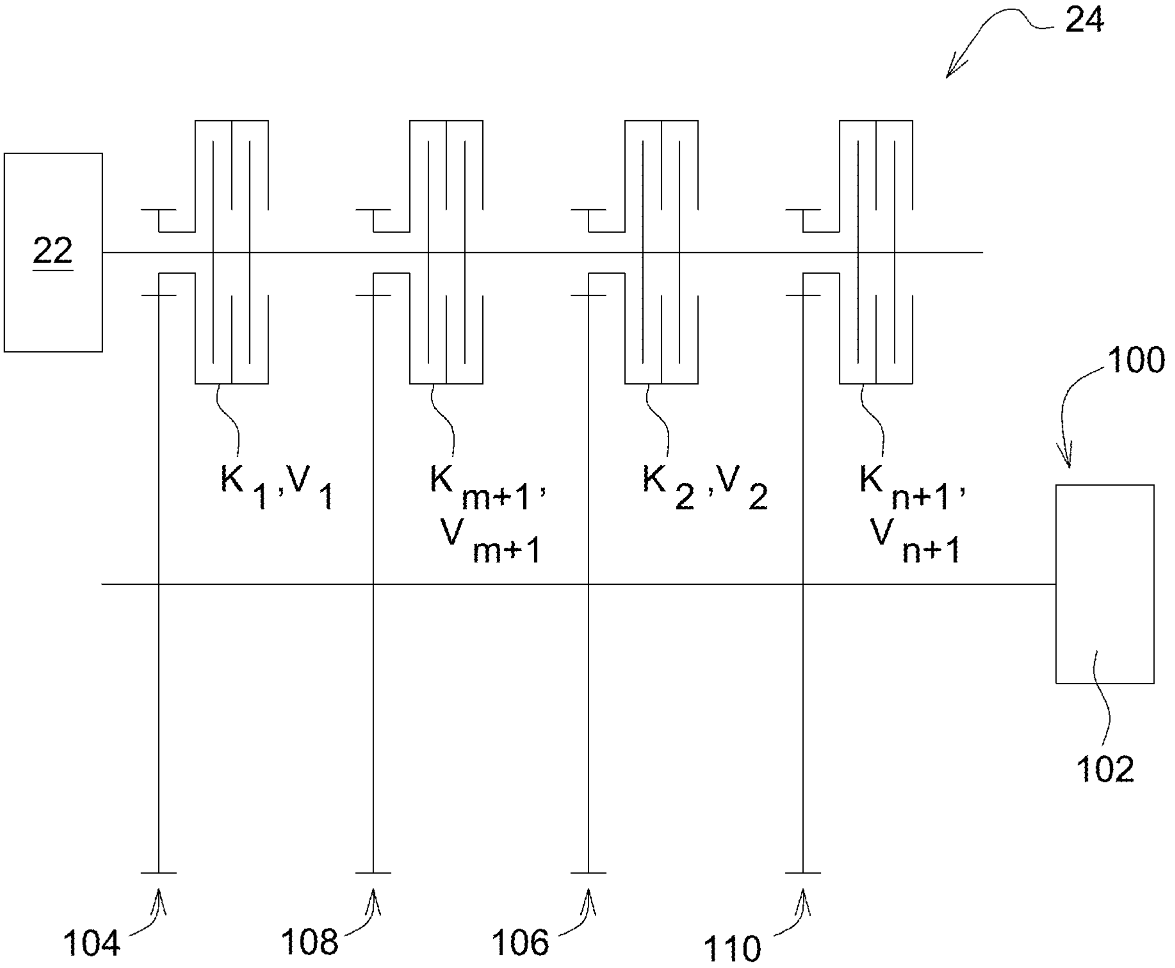
FIG. 2 shows a schematic illustration of a first example embodiment of the drive assembly according to the disclosure.

FIG. 2 shows a schematic illustration of a first example embodiment of the drive assembly 20 according to the disclosure. The drive assembly 20 shown in FIG. 2 corresponds essentially to the drive assembly 20 shown in FIG. 1 such that only details and/or differences will be discussed below. The work machine 10 can comprise the drive assembly 20 as illustrated in FIG. 2.

The drive assembly 20 comprises a main drive element 22, a first and second clutch K1, K2, and a traction drive 100, in particular an output shaft 102. The drive assembly 20 can, however, also comprise further clutches Kn+1, Km+1.

The main drive element 22 is connected to the first and second clutch K1, K2. The first and/or second clutch K1, K2 can be connected to the traction drive 100, in particular to the output shaft 102. Alternatively or additionally, the traction drive can, however, also comprise a further transmission, in particular a power-shift transmission and/or a multistage transmission, wherein the output shaft can be mechanically connected to the further transmission (not illustrated). The further transmission can comprise a further output shaft and the further output shaft can drive the vehicle axles.

A rotational movement generatable by means of the main drive element 22 and/or a torque generatable by means of the main drive element 22 can be imparted to the main transmission 24 or to the first and/or second clutch K1, K2, in particular by means of or via a driven shaft of the main drive element 22, via or by means of a first shaft W1. The main drive element 22 can be connected directly to the first shaft W1 or to the first and/or second clutch K1, K2 or be connected to the first shaft W1 or to the first and/or second clutch K1, K2 by means of or via the driven shaft. The main drive element can, however, also be connected to the first shaft W1 via a first transmission stage (not shown) or a first transmission (not shown) or be connected directly to the first clutch K1. Alternatively or additionally, the main drive element 22 can, however, also be connected to the second clutch K2 via a second transmission stage (not shown) or a second transmission (not shown). The traction drive 100, in particular the output shaft 102, is drivable by or by means of the rotational movement and/or the torque of the main drive element 22.

The first clutch K1, in particular a driven side of the first clutch K1, can be connected to the traction drive 100, preferably to the output shaft 102. In the present case, the first clutch K1 is connected to the traction drive 100 via or by a third transmission stage 104. Additionally, the second clutch K2, in particular a driven side of the second clutch K2, can be connected to the traction drive 100, preferably to the output shaft 102. In the present case, the second clutch is connected to the traction drive 100 via or by a fourth transmission stage 106.

The further clutches Kn+1, Km+1 can be connected to the traction drive 100, preferably to the output shaft 102, via further transmission stages 108, 110 or further transmissions.

The drive assembly 20 can be operated in such a way that:

i. A target torque progression of the drive assembly 20, in particular of the traction drive 100, particularly preferably of the output shaft 102, can be identified, and ii. A slip point at the first clutch K1 can be identified, and iii. The direction of the relative rotational speed of the first and second clutch K1, K2 can be set and/or adjusted, wherein the rotational speed of the main drive element 22 is set and/or adjusted until the direction of the relative rotational speed of the first and second clutch K1, K2 is the same or identical, and iv. The torque can be transmitted from the first clutch K1 to the second clutch K2, wherein in particular during the transmission the opening of the first clutch K1 takes place as a function of an opening progression and the closing of the second clutch K2 takes place as a function of the opening progression of the first clutch K1, wherein in particular the torque of the drive assembly, preferably of the traction drive, particularly preferably of the output shaft, follows the target torque progression, and V. The second clutch K2 can be synchronized by the rotational speed of the main drive element 22 being set and/or adjusted.

The first and second clutch K1, K2 can also be replaced by the further clutch $K_{n+1}$ and the further clutch $K_{m+1}$.

In other words, the control unit 42 can be configured:

To identify a target torque progression of the drive assembly 20, preferably of the traction drive 100, particularly preferably of the output shaft 102, in particular as a function of a shifting procedure of the drive assembly 20, and To identify a slip point at the first clutch K1, and To set and/or adjust the direction or the sign of the relative rotational speed of the first and second clutch K1, K2, wherein the control unit 42 is further configured to set and/or adjust the rotational speed of the main drive element 22 until the direction or the sign of the relative rotational speed of the first and second clutch K1, K2 is the same or identical, and To transmit the torque from the first clutch K1 to the second clutch K2, wherein in particular during the transmission the opening of the first clutch K1 takes place as a function of an opening progression and the closing of the second clutch K2 takes place as a function of the opening progression of the first clutch K1, and To synchronize the second clutch K2 by the rotational speed of the main drive element being set and/or adjusted.

Figure 3:
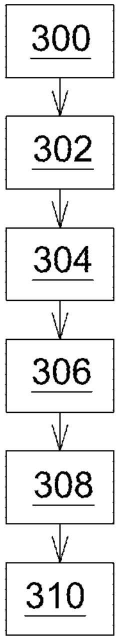
FIG. 3 shows a schematic flow chart of the method according to the disclosure.

FIG. 3 shows a schematic flow chart of the method according to the disclosure. The work machine 10 or the drive assembly 20, in particular in FIG. 1 or 2, can be operatable according to the sequence shown in FIG. 3. The method comprises the following steps:

Following the start in step 300 is the step 302 in which the identifying of a target torque progression of the drive assembly 20, preferably of the traction drive 100, particularly preferably of the output shaft 102, takes place. Specifically, the identifying of the target torque progression can comprise the following substeps:

Identifying a first torque at the traction drive 100, in particular at the output shaft 102, and/or Optionally, identifying a second torque of the drive assembly 20 and identifying the first torque as a function of or by means of the second torque, and/or Identifying the target torque progression as a function of or by means of the first or second torque.

In step 304, the slip point at the first clutch K1 is identified. Identifying the slip point of the first clutch K1 can comprise the following steps:

Opening the first clutch K1 until the rotational speed of the main drive element at the driven side and the rotational speed of the first clutch K1 at the driven side are different.

Specifically, identifying the slip point of the first clutch can comprise the following steps:

Identifying the rotational speed of the main drive element 22 at the driven side and the rotational speed of the first clutch K1 at the driven side, and Comparing the rotational speed of the main drive element 22 at the driven side with the rotational speed of the first clutch K1 at the driven side, and Reducing the torque capacity of the first clutch K1, preferably reducing a current strength of a first valve V1 (see FIG. 2) of the first clutch K1, when the rotational speed of the main drive element 22 at the driven side and the rotational speed of the first clutch K1 at the driven side are the same or identical, and Repeating the previous steps until the rotational speed of the main drive element 22 at the driven side and the rotational speed of the first clutch K1 at the driven side are different.

In a further step 306, the setting and/or adjusting of the direction or the sign of the relative rotational speed of the first and second clutch K1, K2 takes place, wherein the rotational speed of the main drive element 22 is set and/or adjusted until the direction of the relative rotational speed of the first and second clutch K1, K2 is the same. The setting and/or adjusting of the direction or the sign of the relative rotational speed of the first and second clutch K1, K2 can take place as a function of an operating mode.

In step 308, the torque is transmitted from the first clutch to the second clutch, wherein the torque of the drive assembly 20, preferably of the traction drive, particularly preferably of the output shaft, follows the target torque progression. Specifically, transmitting the torque from the first clutch to the second clutch can comprise the following steps:

Opening the first clutch as a function of an opening progression, and

Closing the second clutch as a function of the opening progression of the first clutch.

Opening of the first clutch K1 can comprise reducing or lowering the torque capacity, preferably reducing or lowering the current strength of the first valve V1 of the first clutch K1. Closing the second clutch K2 can comprise increasing of the torque capacity, preferably increasing the current strength of a second valve V2 of the second clutch K2.

Optionally, step 306, or after step 306 and before step 308, can comprise the following steps:

Performing a filling step in which the second clutch is filled with a fluid, and/or Closing the second clutch as a function of a calibrating progression, in particular increasing the current strength of the second valve of the second clutch until the torque of the main drive element is different from the torque at the first clutch.

Optionally, the method can comprise the following step after step 308:

Performing an emptying step in which the first clutch is emptied of a fluid.

The synchronization of the second clutch takes place in step 310 by the rotational speed of the main drive element being set and/or adjusted. The synchronization of the second clutch can comprise the following steps:

Increasing the rotational speed of the main drive element when the drive assembly 20 is operated in an “overrun” operating mode, or Reducing the rotational speed of the main drive element when the drive assembly 20 is operated in a “traction” operating mode.

During or after step 310, i.e. in particular during or after the synchronization, the following steps can take place: completely opening the first clutch, and/or emptying the first clutch, and/or closing the second clutch K2.

Figure 4:
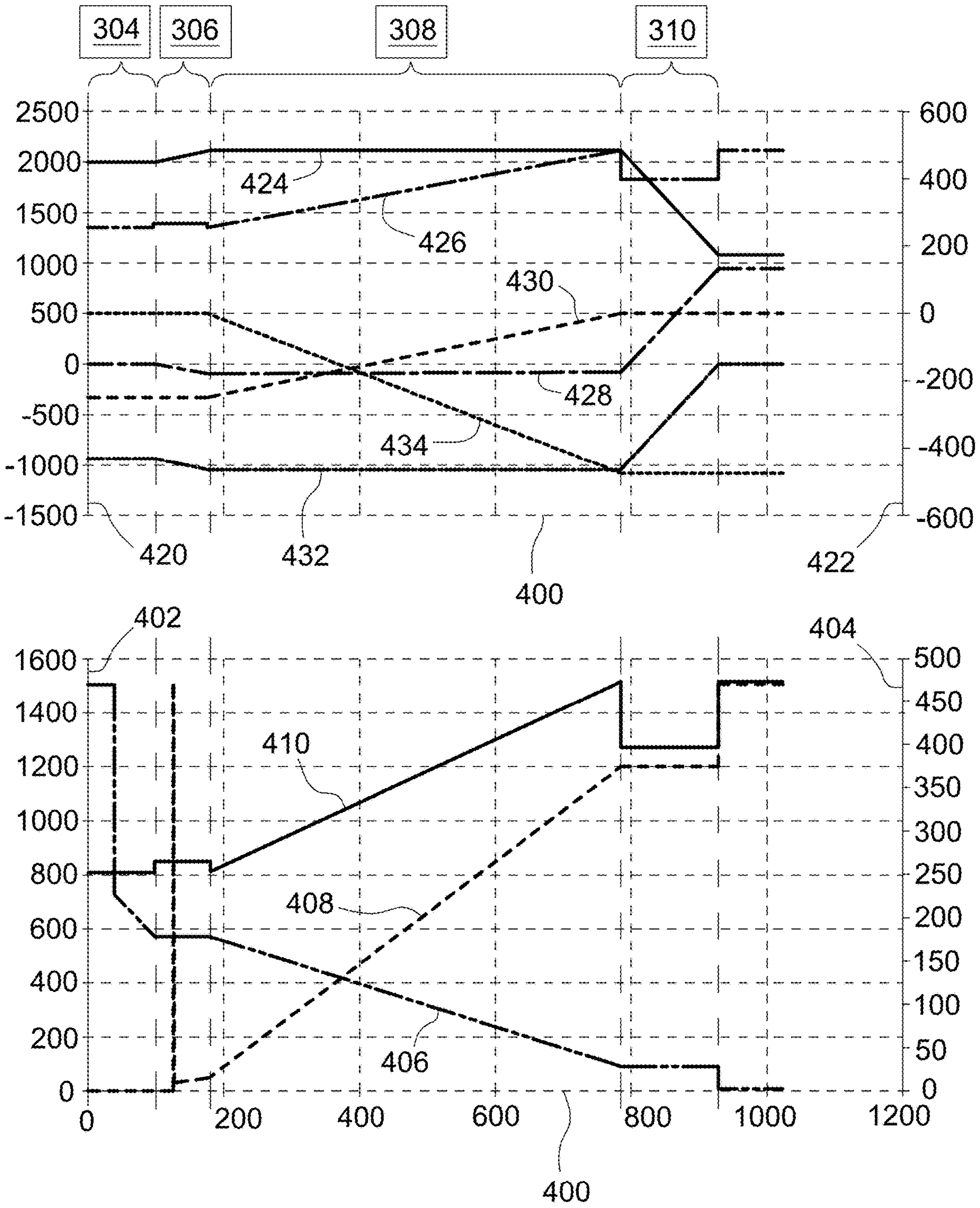
FIG. 4 shows a schematic illustration of a first example embodiment of the method according to the disclosure.

FIG. 4 shows a schematic illustration of a first example embodiment of the method according to the disclosure, in particular in the operating mode “traction” with “traction upshifting”. The method shown in FIG. 4 and described below corresponds essentially to the method in FIG. 3 and described above such that only details and/or differences will be discussed below. The work machine 10 or the drive assembly 20, in particular in FIG. 1 or 2, can be operatable according to the sequence of the method shown in FIG. 4 and described below.

The lower illustration, in particular the lower diagram, shows:

Time is plotted in ms at or on the abscissa 400 or x-axis. The torque capacity or the current strength is plotted in mA at or on the first ordinate 402 or y-axis. The torque is plotted in Nm at or on the second ordinate 404 or y-axis. FIG. 4 shows the progression of the torque capacity or the current strengths of the first and second clutch K1, K2 as well as the progression of the torques, of the direction of the relative rotational speed and the rotational speeds of the first and second clutch K1, K2 as well as of the main drive element 22 in the method steps 304 to 310 as well as the steps after method step 310:

The progression of the torque capacity or the current strength 406 of the first clutch K1 or the clutch K1 to be opened, and The progression of the torque capacity or the current strength 408 of the second clutch K2 or the clutch K2 to be closed, and The progression of the torque 410, 426 of the main drive element 22.

The upper illustration, in particular the upper diagram, shows:

Time is plotted in ms at or on the abscissa 400 or x-axis. The rotational speed is plotted in revolutions per minute at or on the first ordinate 420 or y-axis. The torque is plotted in Nm at or on the second ordinate 422 or y-axis. FIG. 4 further shows:

The progression of the rotational speed 424 of the main drive element 22, and The progression of the torque 410, 426 of the main drive element 22, and The progression of the direction of the relative rotational speed 428 in revolutions per minute of the first clutch K1, and The progression of the torque 430 of the first clutch K1, and The progression of the direction of the relative rotational speed 432 in revolutions per minute of the second clutch K2, and The progression of the torque 434 of the second clutch K2.

The method can here be operated or performed as follows. In method step 304, the torque capacity of the first clutch K1, in particular the current strength of the first valve V1 of the first clutch K1, is regulated very quickly from the maximum torque capacity or from the maximum current into a range in which the first clutch K1 still transmits the applied torque completely without slip. From that point, the torque capacity or the current strength is further reduced until the first clutch K1 reaches the slip point, in particular begins to slip. For the current strength at the first valve, the corresponding torque value thus results at the slip point, in particular at the beginning of the clutch slip. As soon as the slip is recognized at the first clutch K1, the rotational speed of the main drive element 22 is increased in step 306 such that the first and second clutch K1, K2 have the same direction of the relative rotational speed, i.e. in particular the relative speeds of the two clutches K1, K2 have the same direction (same polarity) and therefore do not work against each other. It should be noted that, because the first clutch K1 slips with the full torque and the second clutch K2 furthermore transmits no torque, a change in the rotational speed of the main drive element 22 has no effect on the torque of the traction drive 100, in particular of the output shaft 102. Additionally, in step 306 the first clutch is prefilled with a "fill pulse" and prepared for the application point. As soon as the setting of the rotational speed of the main drive element 22 is completed, the torque transmission of the clutches can begin in step 308. In step 308, the first clutch K1 is opened as a function of an opening progression and the second clutch K2 is closed as a function of the opening progression of the first clutch K1.

Specifically, the torque capacity of the first and second clutch can here be set and/or adjusted in such a way that the torque at the traction drive 100, in particular the output shaft 102, follows the target torque progression. The control unit can preferably be configured to activate and/or set and/or adjust the current strength of the valves V1 and V2 such that the torque at the traction drive 100, in particular the output shaft 102, follows the target torque progression. As soon as the second clutch K2 transmits the whole torque, in step 310 the torque capacity of the first and second clutch K1, K2, preferably the current strength of the first and second valve V1, V2, are kept constant, whilst the second clutch K2 with the main drive element 22 is synchronized to the level of the new transmission ratio. As soon as this synchronization is completed, the torque capacity of the first clutch K1, in particular the current strength of the second valve, is set and/or adjusted to 0 (zero). Moreover, the torque capacity of the second clutch K2, in particular the current strength of the second valve, is set and/or adjusted to their maximum values, as a result of which the shifting procedure is completed.

Figure 5:
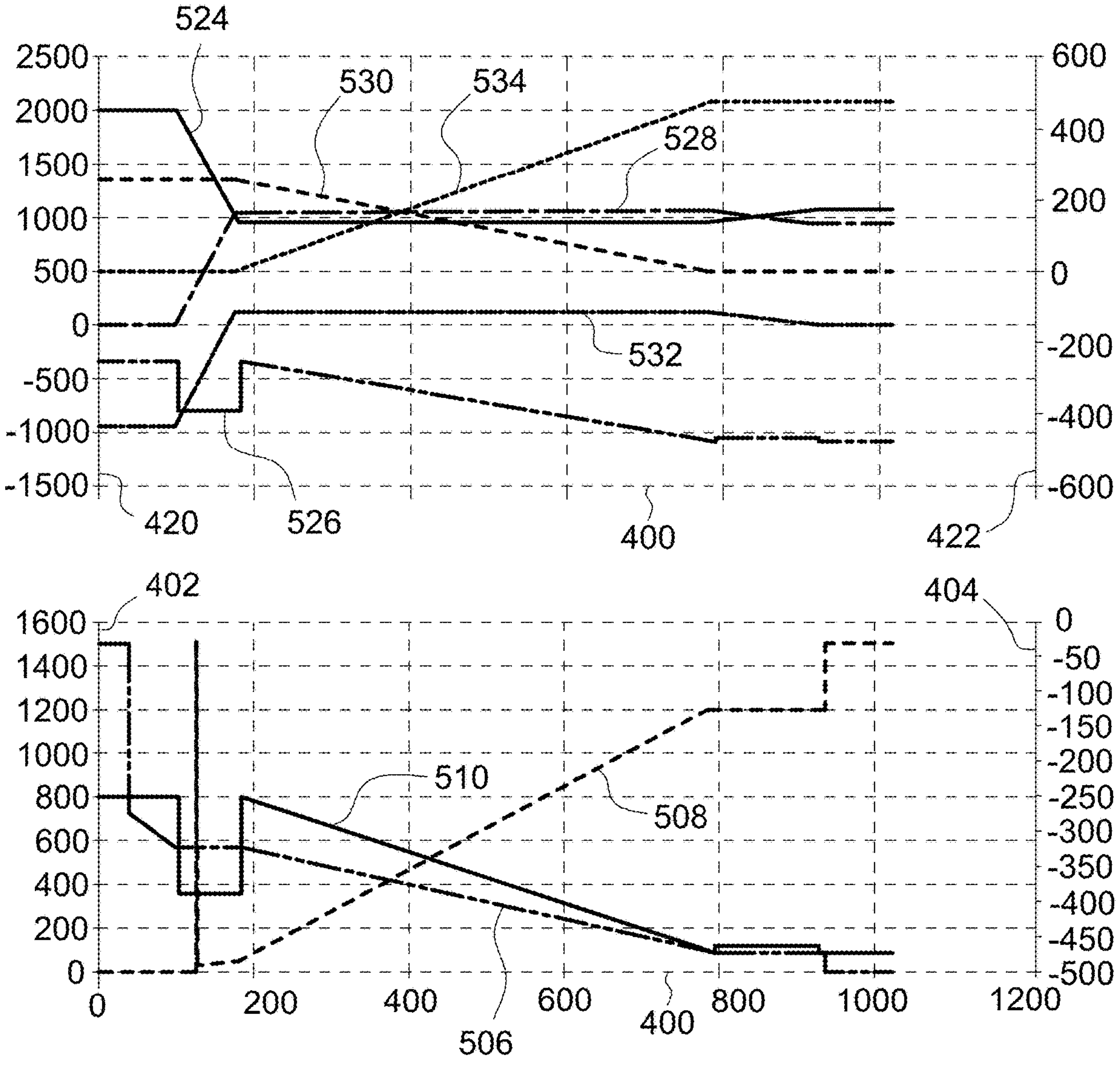
FIG. 5 shows a schematic illustration of a second example embodiment of the method according to the disclosure.

FIG. 5 shows a schematic illustration of a second example embodiment of the method according to the disclosure, in particular in the operating mode "overrun" with "overrun upshifting". The method shown in FIG. 5 and described below corresponds essentially to the method shown in FIGS. 3 and 4 and described above such that only details and/or differences will be discussed below. The work machine 10 or the drive assembly 20, in particular in FIG. 1 or 2, can be operatable according to the sequence of the method shown in FIG. 5 and described below. The lower illustration, in particular the lower diagram, shows:

Time is plotted in ms at or on the abscissa 400 or x-axis. The torque capacity or the current strength is plotted in mA at or on the first ordinate 402 or y-axis. The torque is plotted in Nm at or on the second ordinate 404 or y-axis. FIG. 5 shows the progression of the torque capacity or the current strengths of the first and second clutch K1, K2 as well as the progression of the torques, of the direction of the relative rotational speed and the rotational speeds of the first and second clutch K1, K2 as well as of the main drive element 22 in the operating mode "overrun" with "overrun upshifting" with the method steps 304 to 310 as well as the steps after method step 310:

The progression of the torque capacity or the current strength 506 of the first clutch K1 or the clutch K1 to be opened, and The progression of the torque capacity or the current strength 508 of the second clutch K2 or the clutch K2 to be closed, and The progression of the torque 510, 526 of the main drive element 22.

The upper illustration, in particular the upper diagram, shows:

Time is plotted in ms at or on the abscissa 400 or x-axis. The rotational speed is plotted in revolutions per minute at or on the first ordinate 420 or y-axis. The torque is plotted in Nm at or on the second ordinate 422 or y-axis. FIG. 5 further shows:

The progression of the rotational speed 524 of the main drive element 22, and The progression of the rotational speed 510, 526 of the main drive element 22, and The progression of the direction of the relative rotational speed 528 in revolutions per minute of the first clutch K1, and The progression of the torque 530 of the first clutch K1, and The progression of the direction of the relative rotational speed 532 in revolutions per minute of the second clutch K2, and The progression of the torque 534 of the second clutch K2.

In contrast to the operating mode "traction" with "traction upshifting", in the operating mode "traction" with "traction upshifting" the rotational speed of the main drive element 22 is reduced after the slip point has been recognized. However, the drive assembly 20 or the work machine 10 can, as in the operating mode "traction" with "traction upshifting", accelerate in the operating mode "overrun" with "overrun upshifting".

Figure 6:
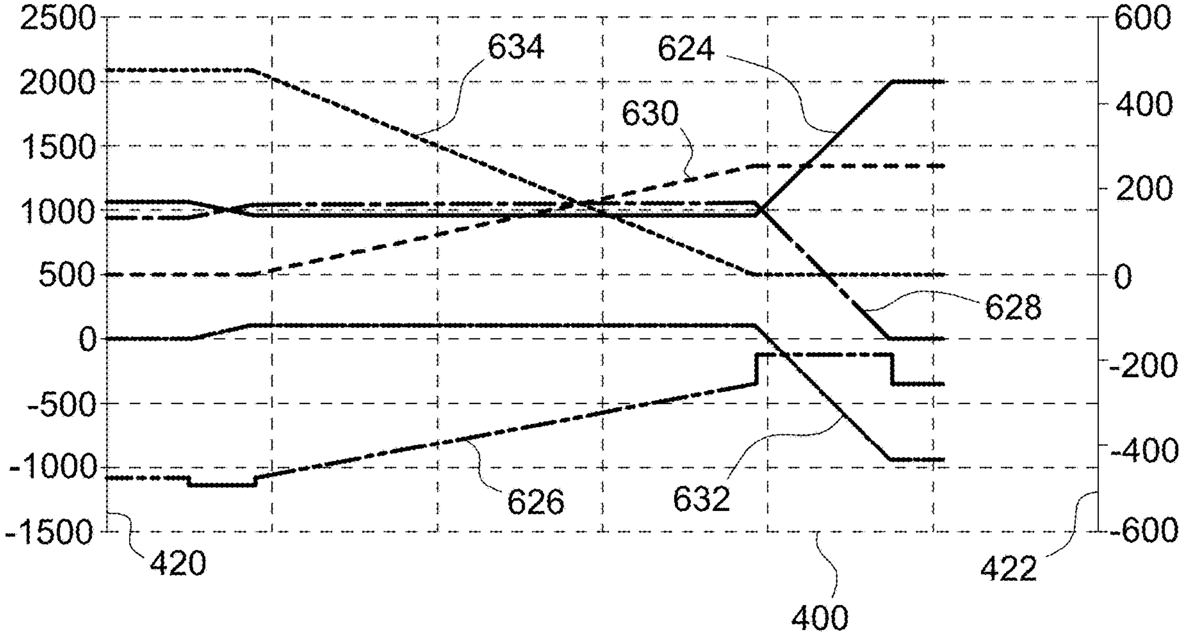
FIG. 6 shows a schematic illustration of a third example embodiment of the method according to the disclosure.
Figure 6:
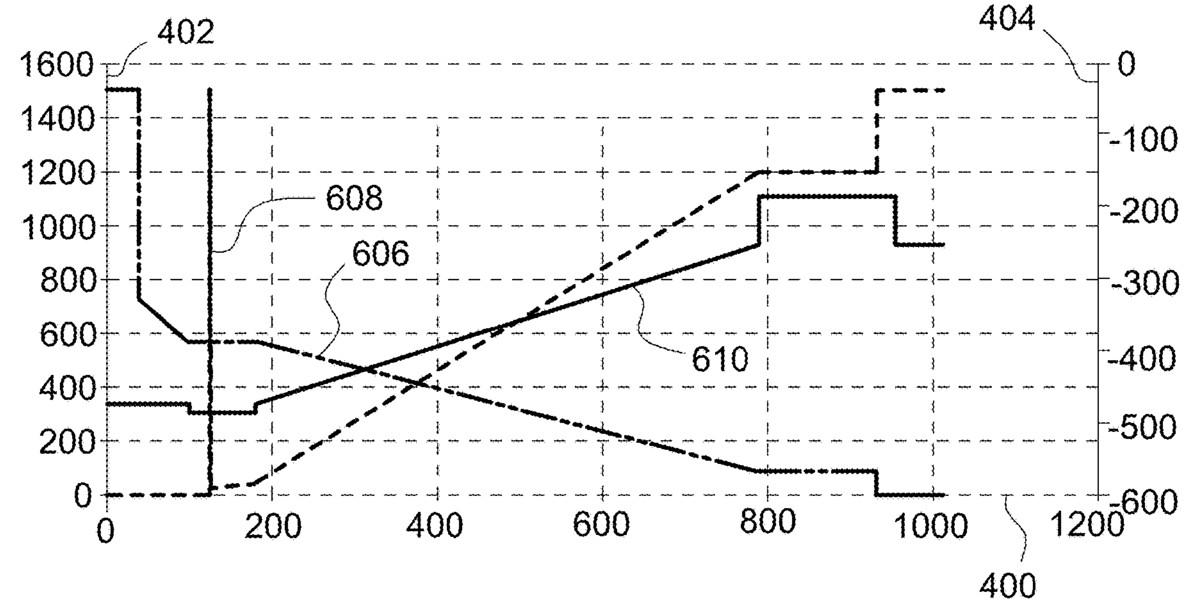

FIG. 6 shows a schematic illustration of a third example embodiment of the method according to the disclosure, in particular in the operating mode "traction" with "traction downshifting". The method shown in FIG. 6 and described below corresponds essentially to the method shown in FIGS. 3 to 5 and described above such that only details and/or differences will be discussed below. The work machine 10 or the drive assembly 20, in particular in FIG. 1 or 2, can be operatable according to the sequence of the method shown in FIG. 6 and described below. The lower illustration, in particular the lower diagram, shows:

Time is plotted in ms at or on the abscissa 400 or x-axis. The torque capacity or the current strength is plotted in mA at or on the first ordinate 402 or y-axis. The torque is plotted in Nm at or on the second ordinate 404 or y-axis. FIG. 6 shows the progression of the torque capacity or the current strengths of the first and second clutch K1, K2 as well as the progression of the torques, of the direction of the relative rotational speed and the rotational speeds of the first and second clutch K1, K2 as well as of the main drive element 22 in the operating mode “traction” with “traction downshifting” with the method steps 304 to 310 as well as the steps after method step 310:

- The progression of the torque capacity or the current strength 606 of the first clutch K1 or the clutch K1 to be opened, and
- The progression of the torque capacity or the current strength 608 of the second clutch K2 or the clutch K2 to be closed, and
- The progression of the torque 610, 626 of the main drive element 22.

The upper illustration, in particular the upper diagram, shows:

Time is plotted in ms at or on the abscissa 400 or x-axis. The rotational speed is plotted in revolutions per minute at or on the first ordinate 420 or y-axis. The torque is plotted in Nm at or on the second ordinate 422 or y-axis. FIG. 6 further shows:

- The progression of the rotational speed 624 of the main drive element 22, and
- The progression of the torque 610, 626 of the main drive element 22, and
- The progression of the direction of the relative rotational speed 628 in revolutions per minute of the first clutch K1, and
- The progression of the torque 630 of the first clutch K1, and
- The progression of the direction of the relative rotational speed 632 in revolutions per minute of the second clutch K2, and
- The progression of the torque 634 of the second clutch K2.

In contrast to the operating mode “traction” with “traction upshifting”, in the operating mode “traction” with “traction downshifting” the change in the rotational speed of the main drive element 22 at the beginning of the shifting procedure, i.e. before the transmission of the torque from the first to the second clutch K1, K2, is less than at the end of the shifting procedure, i.e. after the transmission of the torque from the first to the second clutch K1, K2.

Figure 7:
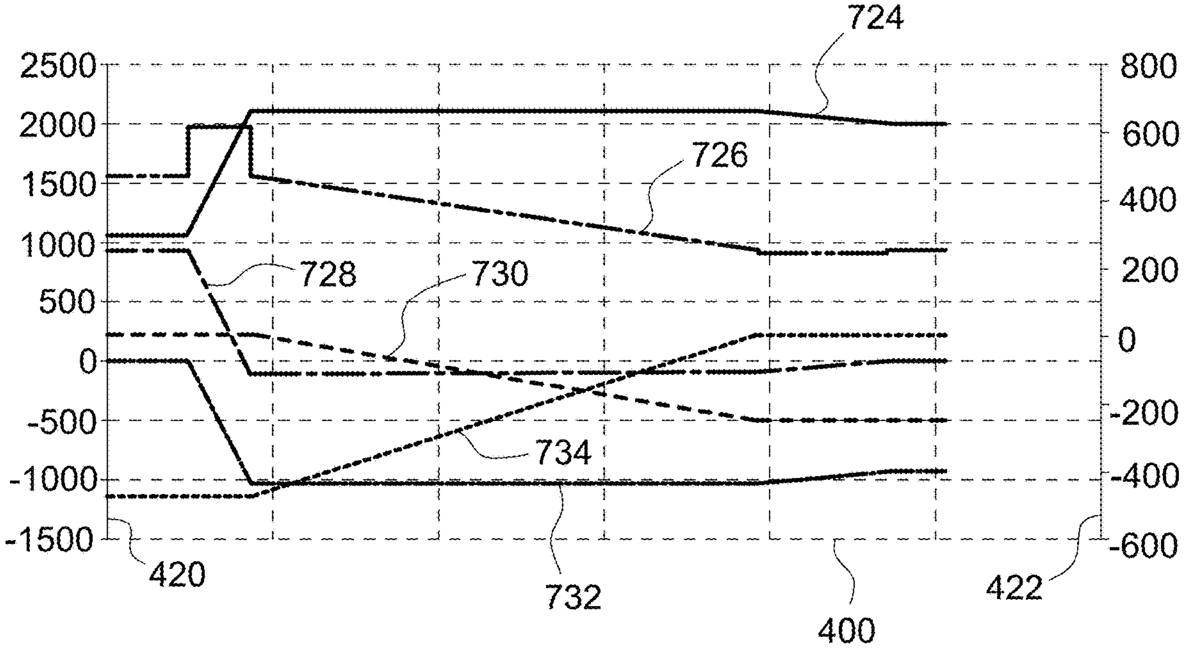
FIG. 7 shows a schematic illustration of a fourth example embodiment of the method according to the disclosure.
Figure 7:
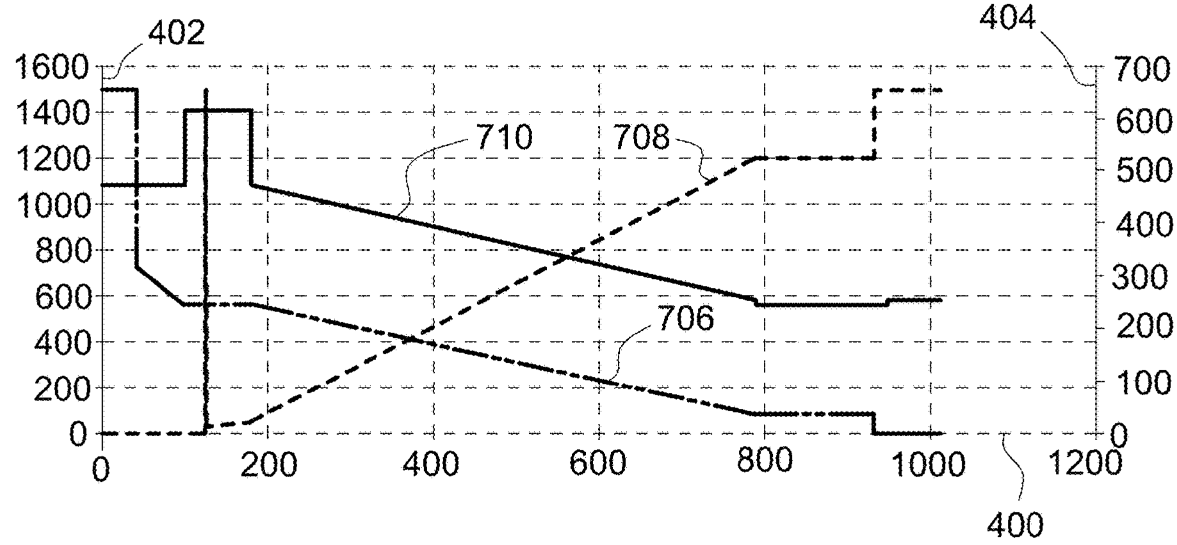

FIG. 7 shows a schematic illustration of a fourth example embodiment of the method according to the disclosure, in particular in the operating mode “overrun” with “overrun downshifting”. The method shown in FIG. 7 and described below corresponds essentially to the method shown in FIGS. 3 to 6 and described above such that only details and/or differences will be discussed below. The work machine 10 or the drive assembly 20, in particular in FIG. 1 or 2, can be operatable according to the sequence of the method shown in FIG. 7 and described below. The lower illustration, in particular the lower diagram, shows:

Time is plotted in ms at or on the abscissa 400 or x-axis. The torque capacity or the current strength is plotted in mA at or on the first ordinate 402 or y-axis. The torque is plotted in Nm at or on the second ordinate 404 or y-axis. FIG. 7 shows the progression of the torque capacity or the current strengths of the first and second clutch K1, K2 as well as the progression of the torques, of the direction of the relative rotational speed and the rotational speeds of the first and second clutch K1, K2 as well as of the main drive element 22 in the operating mode “overrun” with “overrun downshifting” with the method steps 304 to 310 as well as the steps after method step 310:

- The progression of the torque capacity or the current strength 706 of the first clutch K1 or the clutch K1 to be opened, and
- The progression of the torque capacity or the current strength 708 of the second clutch K2 or the clutch K2 to be closed, and
- The progression of the torque 710, 726 of the main drive element 22.

The upper illustration, in particular the upper diagram, shows:

Time is plotted in ms at or on the abscissa 400 or x-axis. The rotational speed is plotted in revolutions per minute at or on the first ordinate 420 or y-axis. The torque is plotted in Nm at or on the second ordinate 422 or y-axis. FIG. 7 further shows:

- The progression of the rotational speed 724 of the main drive element 22, and
- The progression of the torque 710, 726 of the main drive element 22, and
- The progression of the direction of the relative rotational speed 728 in revolutions per minute of the first clutch K1, and
- The progression of the torque 730 of the first clutch K1, and
- The progression of the direction of the relative rotational speed 732 in revolutions per minute of the second clutch K2, and
- The progression of the torque 734 of the second clutch K2.

In contrast to the operating mode “overrun” with “overrun upshifting”, in the operating mode “overrun” with “overrun downshifting” the change in the rotational speed of the main drive element 22 at the beginning of the shifting procedure, i.e. before the transmission of the torque from the first to the second clutch K1, K2, is greater than at the end of the shifting procedure, i.e. after the transmission of the torque from the first to the second clutch K1, K2.

Figure 8:
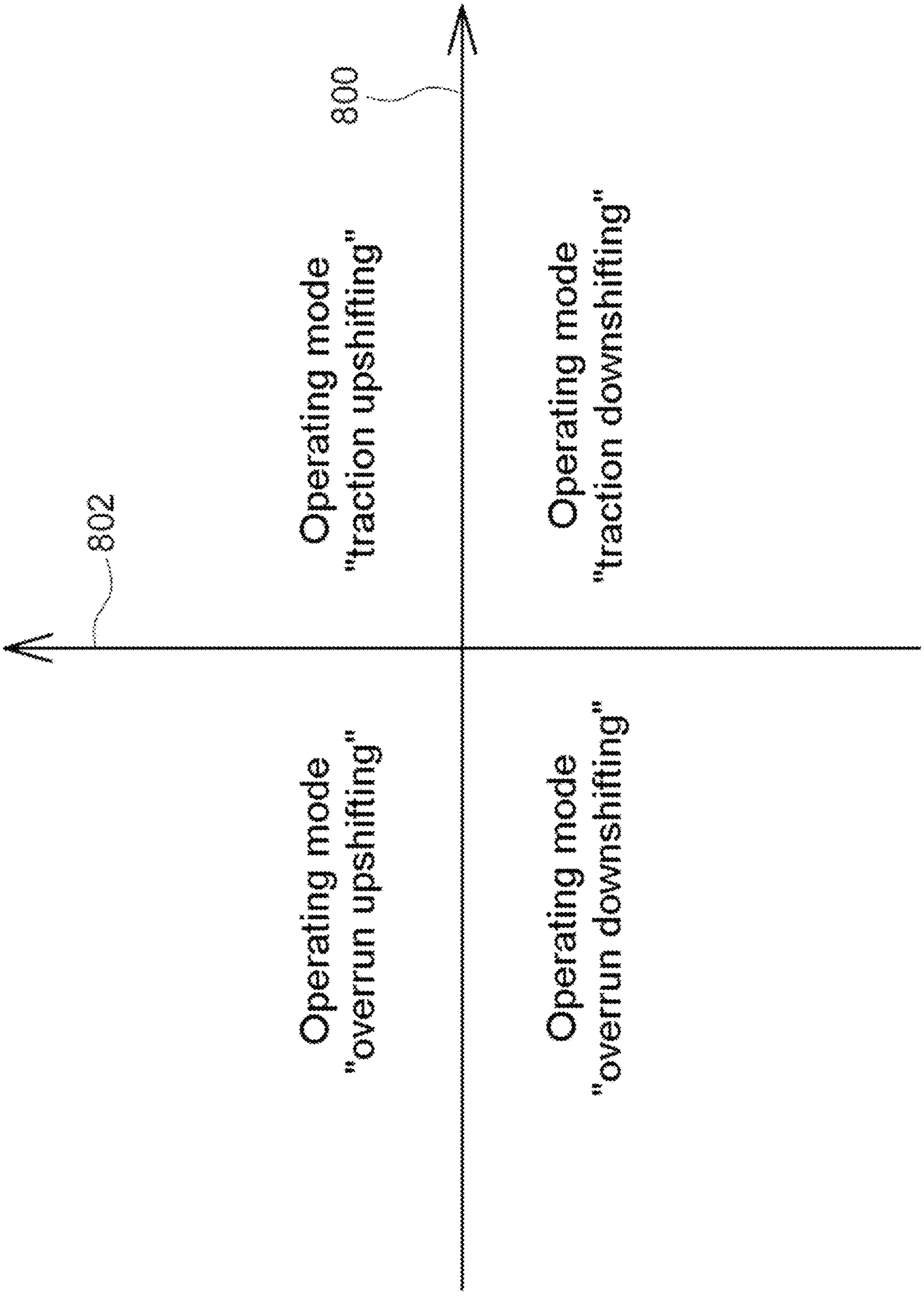
FIG. 8 shows a schematic illustration of the operating modes.

FIG. 8 shows a schematic illustration of the operating modes. The operating modes shown in FIG. 8 and described below correspond essentially to the operating modes shown in FIGS. 3 to 7 and described above such that only details and/or differences will be discussed below. The work machine 10 or the drive assembly 20, in particular in FIG. 1 or 2, can be operatable according to the operating modes shown in FIG. 8 and described below.

The method according to the disclosure can be operatable or performable in four different operating modes:

- The operating mode “traction” with “traction upshifting”—for example, acceleration of the drive assembly 20 or the work machine 10 against resistance, for example uphill or with significant rolling resistance.
- The operating mode “traction” with “traction downshifting”—for example, the drive assembly 20 or the work machine 10 can drive against resistance (for example, uphill with a trailer) and can no longer, for example, maintain the speed in the current gear and have to shift down because of the power limitation.
- The operating mode “overrun” with “overrun upshifting”—for example, acceleration of the drive assembly 20 or the work machine 10 driving downhill. The work machine 10 has to shift up because the drive assembly 20, in particular the main drive element 22, has reached a speed limitation. The flow of force in the drive train can be decelerated.
- The operating mode “overrun” with “overrun downshifting”—for example, decelerating or braking the drive assembly 20 or the work machine 10 driving downhill with the deceleration power of the drive assembly 20 for limiting the vehicle speed.

The four operating modes are illustrated in a diagram in FIG. 8 as belonging to the four quadrants. The torque is plotted in Nm at or on the abscissa 800 or x-axis. The acceleration, in particular the acceleration of the work machine 10, is plotted at or on the first ordinate 802 or y-axis.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method for operating a drive assembly or a work machine, wherein the drive assembly comprises a main drive element, a first and second clutches, and a traction drive, wherein the method comprises:

identifying a target torque progression of the drive assembly, identifying a slip point at the first clutch, setting or adjusting a direction of a relative rotational speed of the first and second clutch, wherein a rotational speed of the main drive element is set or adjusted until the direction of the relative rotational speed of the first and second clutch is the same, transmitting a torque from the first clutch to the second clutch, wherein a torque of the drive assembly follows the target torque progression, and synchronizing the second clutch by the rotational speed of the main drive element being set or adjusted.

2. The method of claim 1, wherein identifying the target torque progression comprises:

identifying a first torque at the traction drive, identifying a second torque of the drive assembly and identifying the first torque as a function of the second torque, or identifying the target torque progression as a function of the first or second torque.

3. The method of claim 1, wherein identifying the slip point of the first clutch comprises:

opening the first clutch until the rotational speed of the main drive element at a driven side and a rotational speed of the first clutch at the driven side, or the rotational speed of the first clutch at a drive side and the rotational speed of the first clutch at the driven side, are different.

4. The method of claim 3, wherein identifying the slip point of the first clutch comprises:

identifying the rotational speed of the main drive element at the driven side and the rotational speed of the first clutch at the driven side, comparing the rotational speed of the main drive element at the driven side with the rotational speed of the first clutch at the driven side, and reducing the torque capacity of the first clutch, when the rotational speed of the main drive element at the driven side and the rotational speed of the first clutch at the driven side are identical, until the rotational speed of the main drive element at the driven side and the rotational speed of the first clutch at the driven side are different.

5. The method of claim 1, wherein the setting or adjusting of the direction of the relative rotational speed of the first and second clutch takes place as a function of an operating mode.

6. The method of claim 1, wherein the method comprises:

performing a filling step in which the second clutch is filled with a fluid, or performing an emptying step in which the first clutch is emptied of a fluid.

7. The method of claim 1, wherein the method comprises:

closing the second clutch as a function of a calibrating progression, increasing the current strength of a second valve of the second clutch until the torque of the main drive element is different from the torque at the first clutch.

8. The method of claim 1, wherein transmitting of the torque from the first clutch to the second clutch comprises:

opening the first clutch as a function of an opening progression, and closing the second clutch as a function of the opening progression of the first clutch.

9. The method of claim 1, wherein synchronizing the second clutch comprises:

increasing the rotational speed of the main drive element when the drive assembly is operated in an overrun operating mode, or reducing the rotational speed of the main drive element when the drive assembly is operated in a traction operating mode.

10. The method of claim 1, wherein the following steps take place after the synchronization:

completely opening the first clutch, or emptying the first clutch, or closing the second clutch.

11. A drive assembly for performing a method, the drive assembly comprising:

a main drive element, a first clutch, a second clutch, a traction drive, wherein the method comprises:

identifying a target torque progression of the drive assembly, identifying a slip point at the first clutch, setting or adjusting a direction of a relative rotational speed of the first and second clutch, wherein a rotational speed of the main drive element is set or adjusted until the direction of the relative rotational speed of the first and second clutch is the same, transmitting a torque from the first clutch to the second clutch, wherein a torque of the drive assembly follows the target torque progression, and synchronizing the second clutch by the rotational speed of the main drive element being set or adjusted.

12. The drive assembly of claim 11, wherein the main drive element is connected to the first and second clutches, and the first or second clutch is connected to the traction drive; and a rotational movement which can be generated by the main drive element or a generatable torque can be imparted to the first or second clutch and can be driven by the rotational movement or the torque of the main drive element.

13. A work machine comprising a drive assembly, the drive assembly comprising:

a main drive element, a first clutch, a second clutch, a traction drive, wherein the method comprises:

identifying a target torque progression of the drive assembly, identifying a slip point at the first clutch, setting or adjusting a direction of a relative rotational speed of the first and second clutch, wherein a rotational speed of the main drive element is set or adjusted until the direction of the relative rotational speed of the first and second clutch is the same, transmitting a torque from the first clutch to the second clutch, wherein a torque of the drive assembly follows the target torque progression, and synchronizing the second clutch by the rotational speed of the main drive element being set or adjusted.

* * * * *